United States Patent
Fujimoto et al.

(10) Patent No.: US 7,024,043 B1
(45) Date of Patent: Apr. 4, 2006

(54) COLOR DOCUMENT IMAGE RECOGNIZING APPARATUS

(75) Inventors: Katsuhito Fujimoto, Kanagawa (JP); Hiroshi Kamada, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/372,037

(22) Filed: Aug. 11, 1999

(30) Foreign Application Priority Data

Dec. 11, 1998 (JP) .................................. 10-353045

(51) Int. Cl.
*G06K 15/00* (2006.01)
*G06K 9/36* (2006.01)
*G06K 9/00* (2006.01)

(52) U.S. Cl. .................... 382/237; 382/167; 358/2.1; 358/3.02

(58) Field of Classification Search ................ 382/237, 382/282, 167; 358/2.99, 3.02, 2.1, 530, 452, 358/462, 464; 435/39
See application file for complete search history.

(56) References Cited

U.S. PATENT DOCUMENTS

| | | | | |
|---|---|---|---|---|
| 5,403,722 A | * | 4/1995 | Floeder | 435/39 |
| 5,912,698 A | * | 6/1999 | Graulich | 348/91 |
| 5,988,504 A | * | 11/1999 | Smitt | 382/237 |
| 6,139,873 A | * | 10/2000 | Hughes, Jr. | 424/464 |
| 6,160,913 A | * | 12/2000 | Lee et al. | 382/176 |
| 6,356,362 B1 | * | 3/2002 | Ostromoukhov | 358/1.9 |
| 2001/0041003 A1 | * | 11/2001 | Grohs et al. | 382/166 |

FOREIGN PATENT DOCUMENTS

| | | | |
|---|---|---|---|
| JP | 5-344330 | | 12/1993 |
| JP | 7-65123 | | 3/1995 |
| JP | 7-236062 | | 9/1995 |
| JP | 9-81743 | | 3/1997 |
| JP | 10-145322 | | 5/1998 |
| JP | 2000-181992 | * | 6/2000 |

* cited by examiner

*Primary Examiner*—Jerome Grant, II
(74) *Attorney, Agent, or Firm*—Staas & Halsey LLP

(57) ABSTRACT

After a gray scale image extracting unit converts an input document image to a gray scale image, a multi-code image binary-coding unit converts the image to a binary image having a value in which each pixel indicates either a background area or a plotting area in the image, and outputs the binary image to a binary image recognizing unit. In the multi-code binary-coding unit, a partial area extracting unit extracts one or more partial areas in the gray scale image. A partial image binary-coding unit executes a binary-coding process for each of the partial areas in the gray scale image. A binary image combining unit combines one or more partial binary images and constitutes a binary image of the entire gray scale image.

39 Claims, 20 Drawing Sheets

COLOR DOCUMENT IMAGE RECOGNIZING APPARATUS

BACKGROUND OF THE INVENTION

1. Field of the Invention

The present invention relates to a recognition technology of color document images.

2. Description of the Related Art

A document image recognizing apparatus executes an encoding process by recognizing characters in a document image when the document image is inputted. Recently a product to which a binary document image can be inputted has been developed. Recently the use of an image filing device has been widespread, and demand for recognizing an image which is filed by such a device when the image is inputted to a document image recognizing apparatus, has been increasing. A color document image recognizing apparatus also targets the recognition of color document images and gray scale document images.

As personal computers are widespread and information communications networks have improved, many electronically filed documents have appeared. However, the major medium of information distribution is still paper documents, and there are many existing paper documents. Under these circumstances, demand for a document image recognizing apparatus which can convert a paper document into an electronically filed document and edit the conversion result, has been increasing. In particular, since many gray scale documents and color documents contain pictures, demand for an apparatus such that can recognize not only binary documents, but also gray scale documents and color documents, has been increasing.

If an input document image is not a binary image, but a gray scale image or color image, a conventional color document recognizing apparatus binary-codes the lightness element of each pixel using a constant threshold, obtains a binary image with one of two kinds of values, that is, a value indicating that each pixel is located in a plotting area, such as a ruled line, stroke of a character/drawing, etc., and a value indicating that each pixel is located in a background area, and performs document recognition based on the obtained binary image.

FIG. 1 shows the configuration of a conventional color document image recognizing apparatus.

If an input document image 2201 is a color image, a gray scale image extracting unit 2202 outputs a gray scale image by extracting the gray scale value of a lightness element, etc., for each pixel.

When a gray scale image is inputted, a constant threshold binary-coding unit 2203 obtains a binary image by executing a binary-coding process for the inputted gray scale image using a constant threshold. This threshold is designated and inputted from the outside, or is obtained by computing the pixel value of a gray scale image, such as Otsu's binary-coded threshold (see Journal of the Institute of Electronic Information and Communication J63-D, No. 4 (1980), 349–356).

A local binary-coding unit 2204 obtains a binary image representing a finer plotting area by obtaining and binary-coding the variable threshold of each pixel in the plotting area of the binary image which is outputted by the constant threshold binary-coding unit 2203 using the pixel value of an area several times as large as a character stroke or of about half the size.

A binary image recognizing unit 2205 recognizes the binary image and outputs a recognition result 2206.

The object of the local binary-coding unit 2204 is to judge the binary image which is obtained from a lightness image using a single threshold, such as Otsu's binary-coded threshold, and to be the roughly obtained plotting area of the inputted color document image and to obtain a finer plotting area by performing finer binary-coding for each pixel of the rough plotting area using a variable threshold. A simpler configuration can also be considered and which is not provided with a local binary-coding unit 2204 and in which the binary image outputted by the constant threshold binary-coding unit 2203 is inputted to the binary image recognizing unit 2205 without modification.

However, the conventional color document image recognizing apparatus shown in FIG. 1 has a weak point in that if there are two or more background colors or plotting colors of a document in an input color document, or if gradation is applied to a background color or plotting color, a part of the plotting area of the input color document becomes a background area or a part of the background area becomes a plotting area in the generated binary image, and thus recognition accuracy is reduced.

The conventional color document image recognizing apparatus is characterized by binary-coding a gray scale image with the constant threshold binary-coding unit 2203 using a constant threshold and utilizing a binary image in which the plotting area of the input color document is roughly extracted in a subsequent process. For this reason, if there are two or more background colors or plotting colors of a document in an input color document, or if gradation is applied to a background color or plotting color, the relationship between the size of the pixel value of the background area and the pixel value of the plotting area of the gray scale image is not always constant. Therefore, if the gray scale image is binary-coded using a single threshold, a part of the plotting area of the input color document becomes a background area or a part of the background area becomes a plotting area in the generated binary image.

If binary-coding using a constant threshold is not performed and local binary-coding is performed for all the pixels of a gray scale image, a different threshold is used for each pixel, and if the entire neighborhood has almost the same background color or plotting color, noise in the gray-white-flecked state occurs in which the background color and plotting color are finely mixed. For this reason, binary-coding using a constant threshold is introduced in a preceding stage to limit a target to be locally binary-coded to the neighborhood of a plotting area and to prevent the gray-white-flecked noise from occurring, which becomes the cause of the problem described above.

SUMMARY OF THE INVENTION

The background of the present invention has been described above, and an object of the present invention is to be able to distinguish a background area from a plotting area even if there are two or more background colors or plotting colors of a document in an input color document, or if gradation is applied to a background color or plotting color.

In the present invention, the aggregate of partial areas of a single background color and single plotting color covering the plotting area of an input color document image is obtained, a partial binary image is generated by performing binary-coding using a prior art for each partial area, and a binary image of an entire gray scale image is constituted by combining the partial binary images.

In order to obtain the partial area of a single background color and single plotting color, partial areas, such as the neighborhood area of a character with an almost uniform background color and an almost uniform plotting color are extracted by extracting the outline of the plotting area of an input color document image using edge extraction and by combining closely located edge pixels.

If there are two or more background colors or plotting colors of a document in an input color document or if gradation is applied to a background color or plotting color, a target to be binary-coded using a constant threshold is the partial area of a single background color and single plotting color. Therefore, the present invention has an effect such that a color document image can be accurately binary-coded and recognized.

BRIEF DESCRIPTION OF THE DRAWINGS

The other objects and features of the present invention will be more apparent to a person having ordinary skill in the art from the following detailed description in conjunction with the accompanying drawings, in which:

FIG. 11 shows an example binary-coding result according to a conventional apparatus (No. 1).

FIG. 12 shows an example partial area extraction according to a preferred embodiment of the present invention (No. 1).

FIG. 13 shows an example binary-coding result according to a preferred embodiment of the present invention (No. 1).

FIG. 14 shows an example color document (No. 2).

Figure 15:
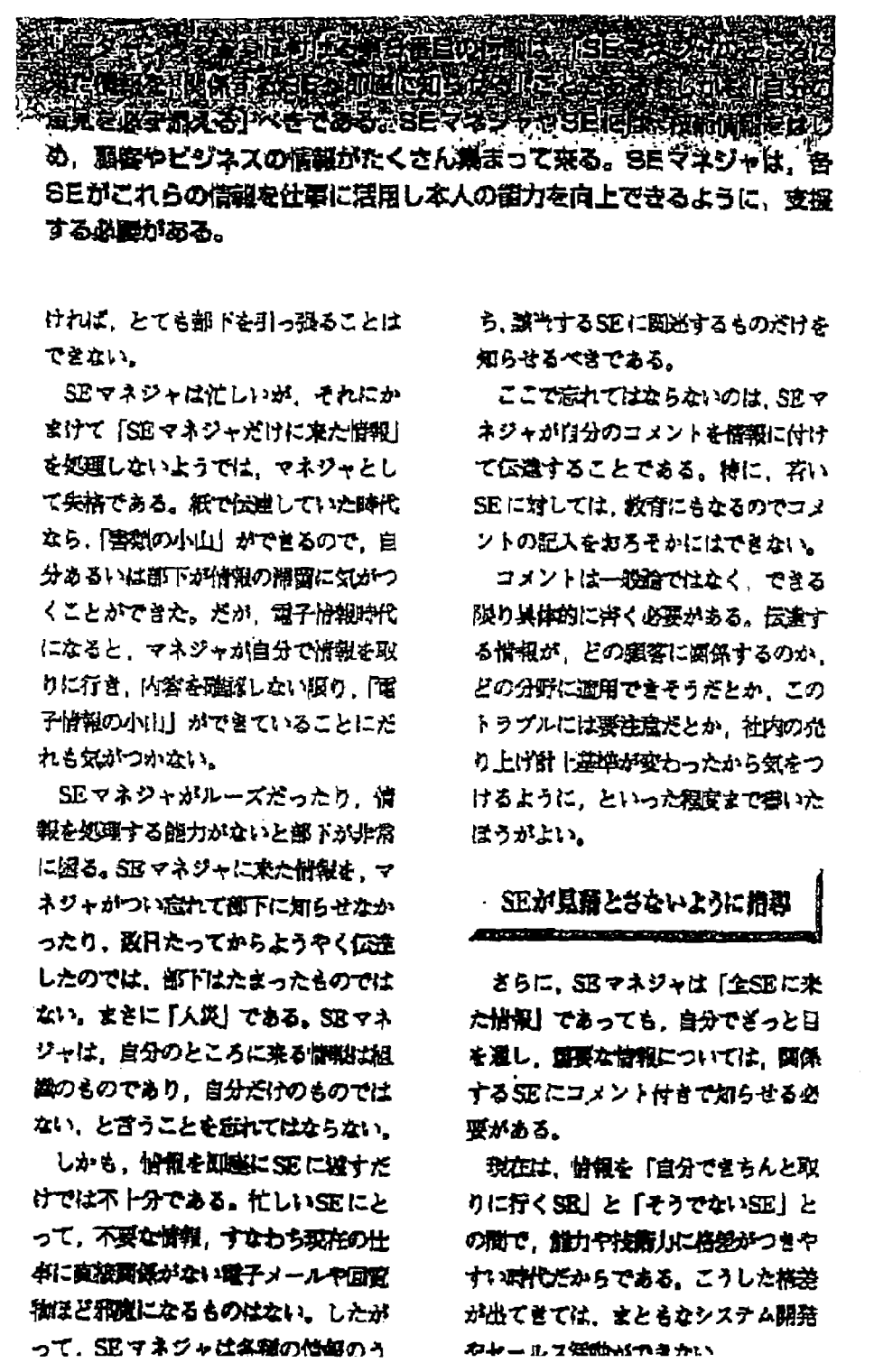

FIG. 15 shows an example binary-coding result according to a conventional apparatus (No. 2).

Figure 16:
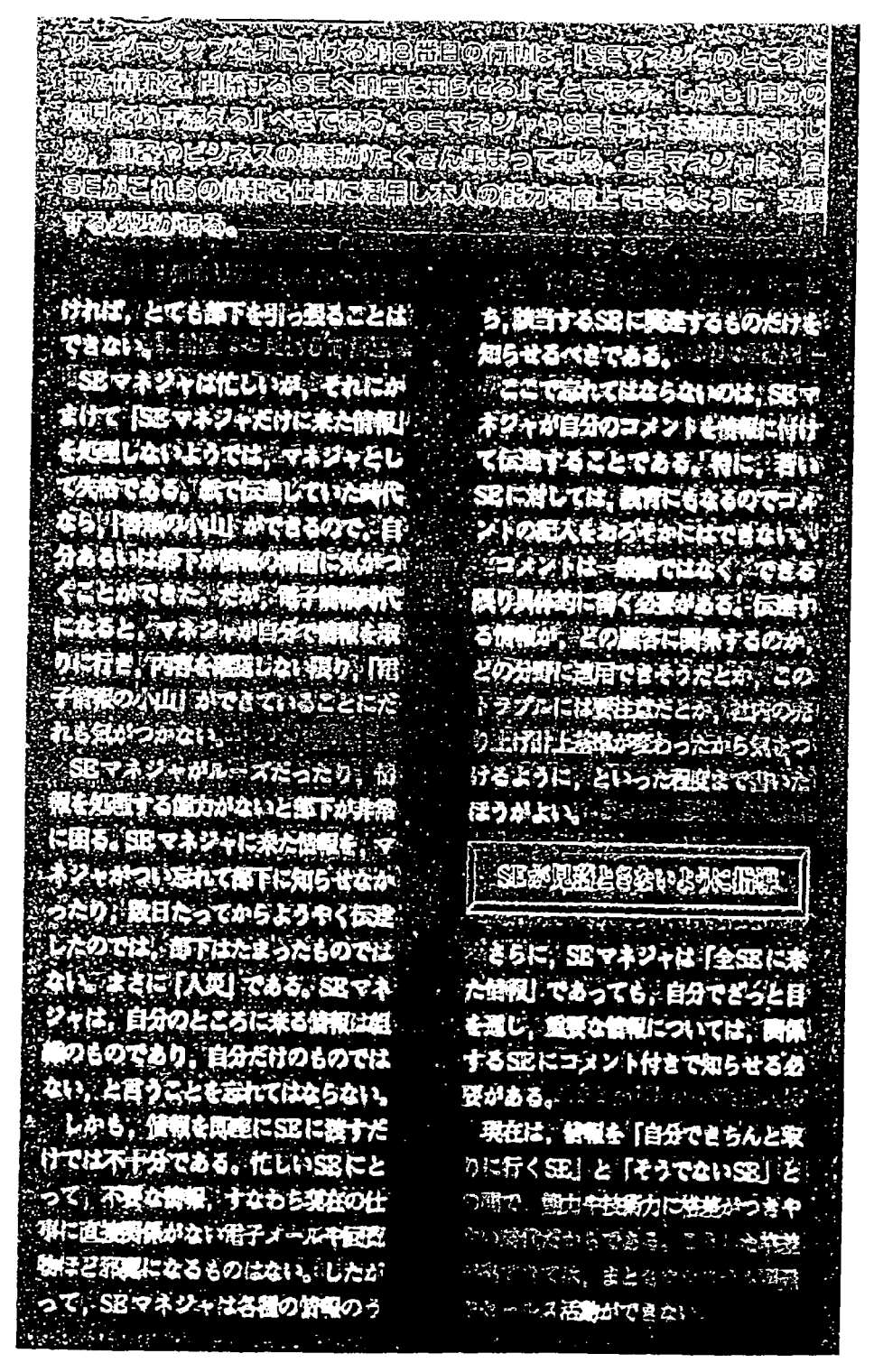

FIG. 16 shows an edge strength image after edge extraction according to a preferred embodiment of the present invention.

Figure 17:
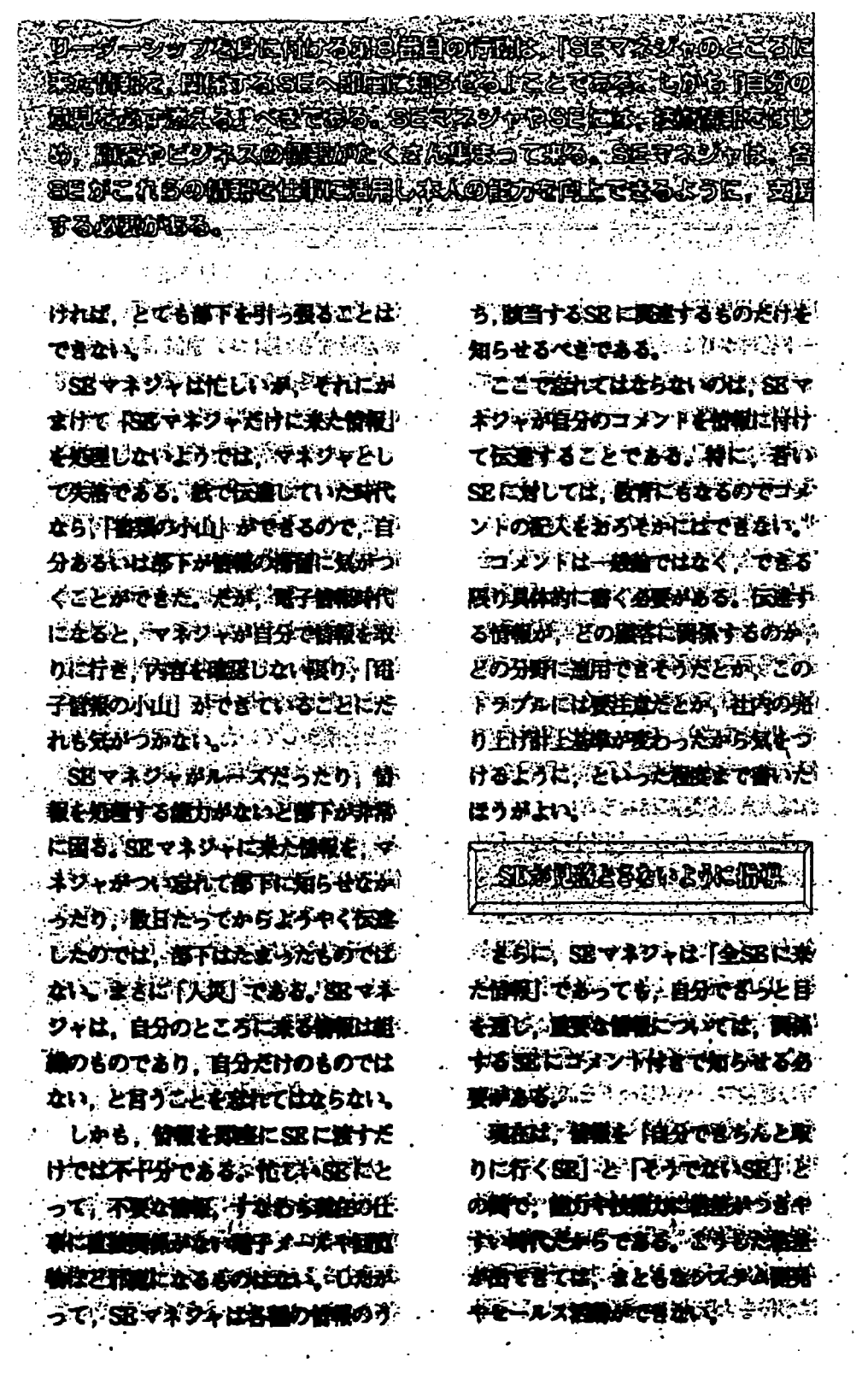

FIG. 17 shows an edge binary image according to a preferred embodiment of the present invention.

Figure 18:
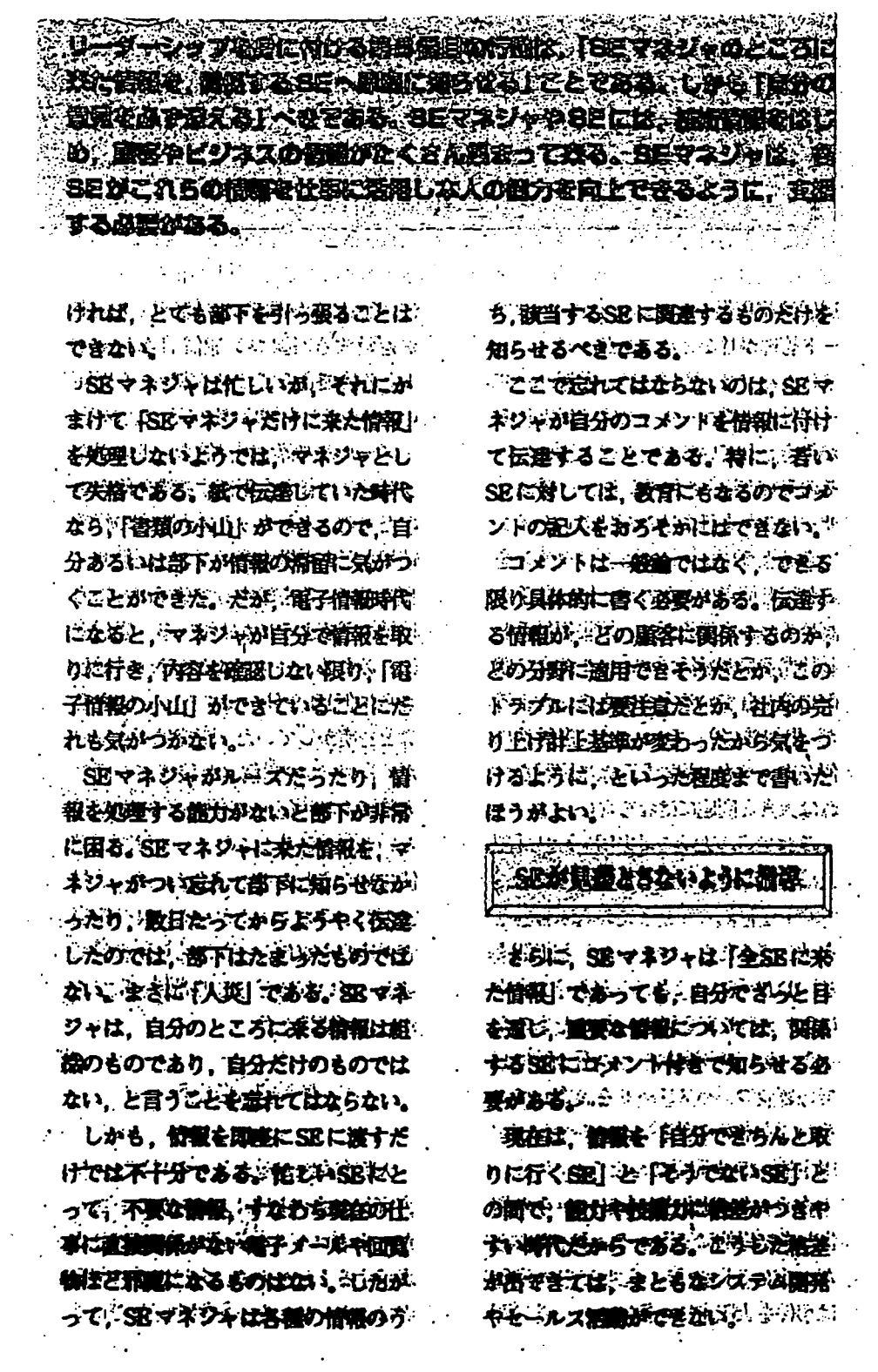

FIG. 18 shows the contracted image of an edge binary image according to a preferred embodiment of the present invention.

Figure 19:
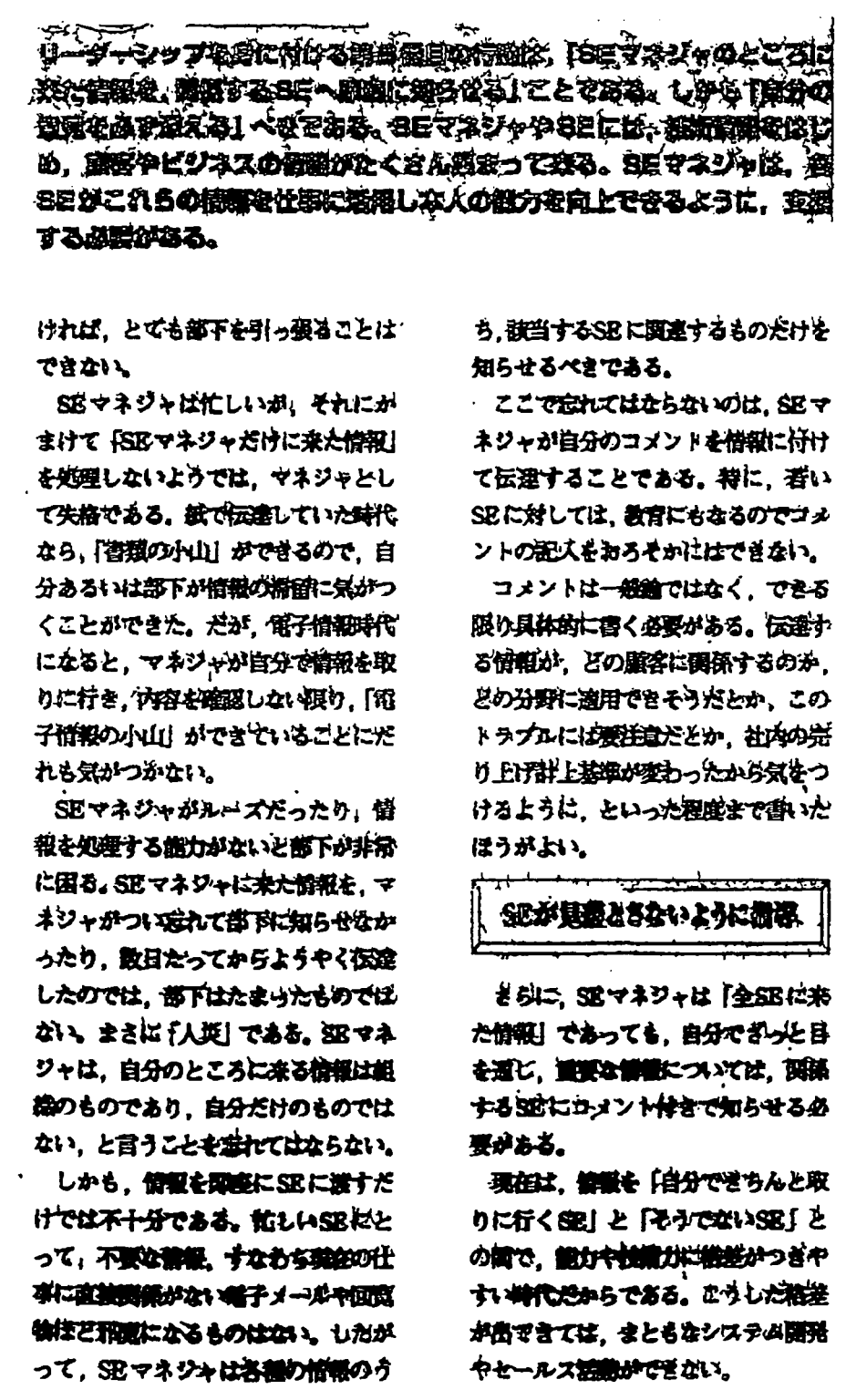

FIG. 19 shows an image after removing noise from a contracted image according to a preferred embodiment of the present invention.

Figure 20:
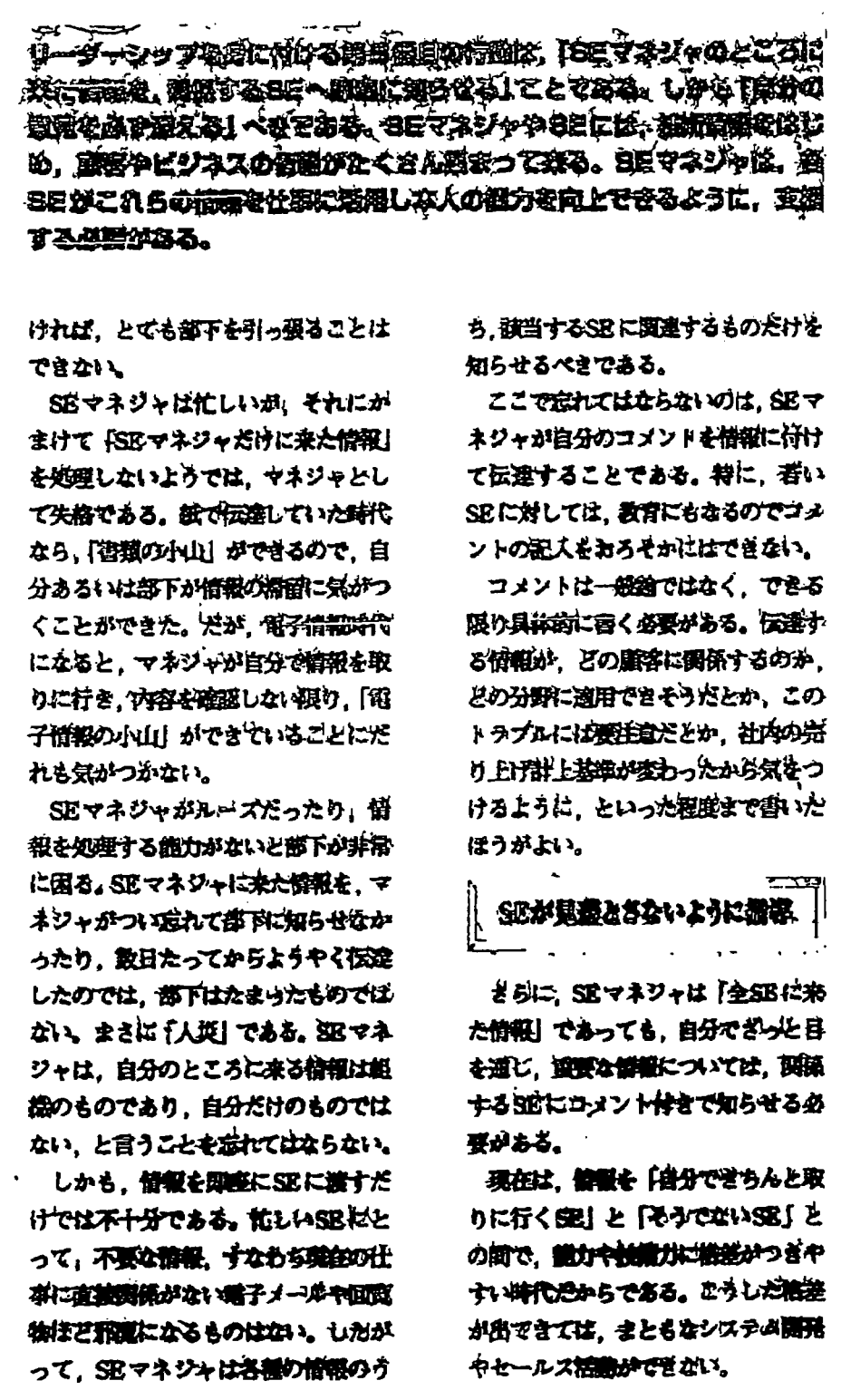

FIG. 20 shows an image after ruled-line removal according to a preferred embodiment of the present invention.

Figure 21:
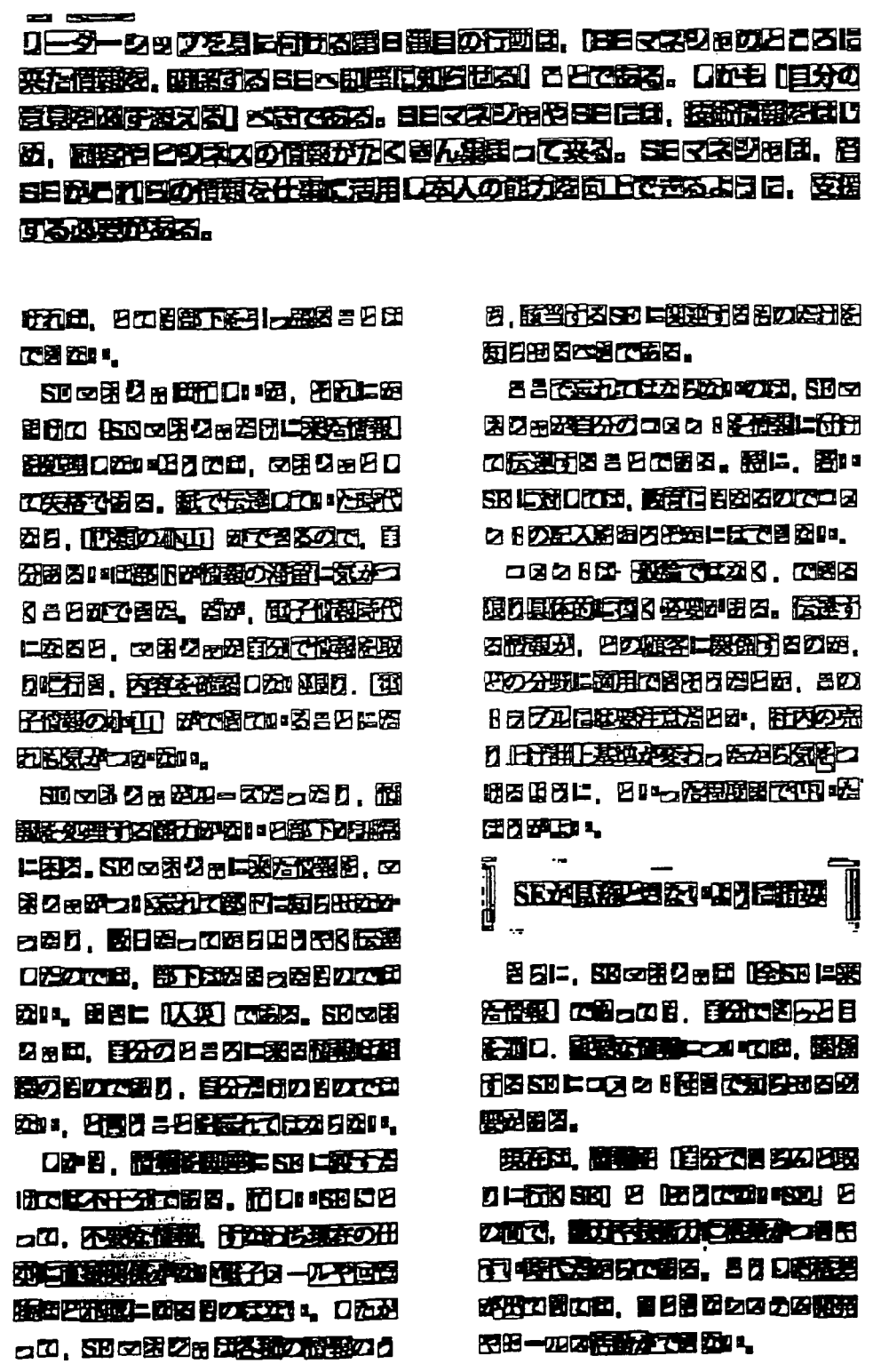

FIG. 21 shows an example partial area extraction according to a preferred embodiment of the present invention (No. 2).

FIG. 22 shows an example binary-coding result according to a preferred embodiment of the present invention (No. 2).

DESCRIPTION OF THE PREFERRED EMBODIMENTS

Figure 2:
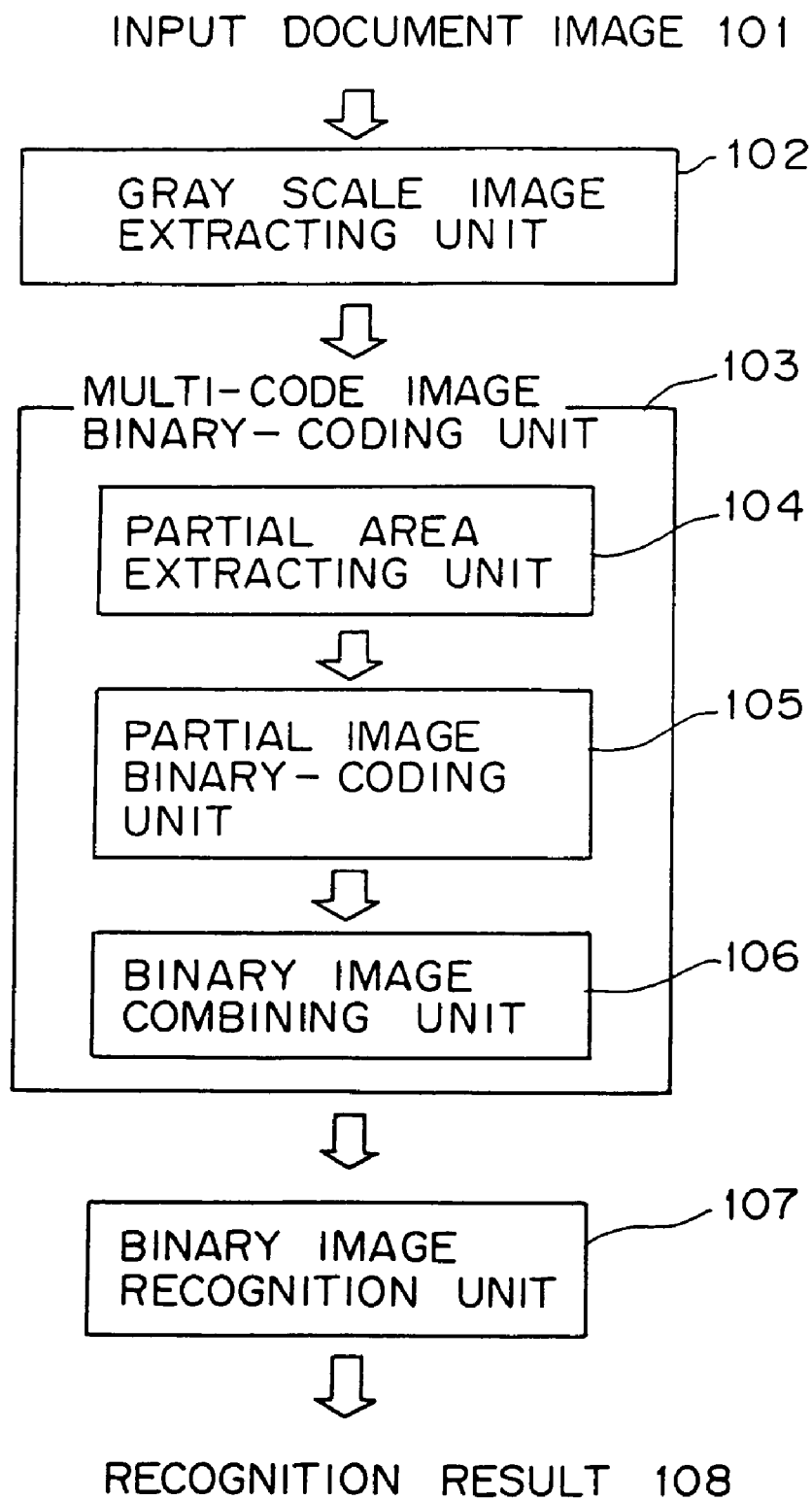
FIG. 2 shows the configuration of a color document image recognizing apparatus, which is a preferred embodiment of the present invention.

FIG. 2 shows the configuration of a color document image recognizing apparatus in a preferred embodiment of the present invention.

This preferred embodiment is provided with a gray scale image extracting unit 102 and a multi-code image binary-coding unit 103. An input document image 101 is inputted from an input circuit to the gray scale image extracting unit 102. The input documemt image 101 is a color image or gray scale image.

If the input document image 101 is a color image, after the gray scale image extracting unit 102 converts the input document image 101 to a gray scale image, the multi-code image binary-coding unit 103 converts the gray scale image to a binary image in which each pixel represents either a background area or plotting area in the gray scale image.

If the input document image 101 is a gray scale image, the multi-code binary-coding unit 103 converts the input document image 101 to a binary image and outputs the binary image.

A binary image recognizing unit 107 recognizes the binary image outputted by the multi-code image binary-coding unit 103, and outputs an electronically coded recognition result 108.

The multi-code image binary-coding unit 103 includes a partial area extracting unit 104, a partial image binary-coding unit 105 and a binary image combining unit 106. The partial area extracting unit 104 extracts one or more partial areas in the gray scale image. The partial image binary-coding unit 105 executes a binary-coding process for each partial area of the gray scale image. The binary image combining unit 106 constitutes a binary image of the entire gray scale image by combining the one or more partial binary images.

Figure 1:
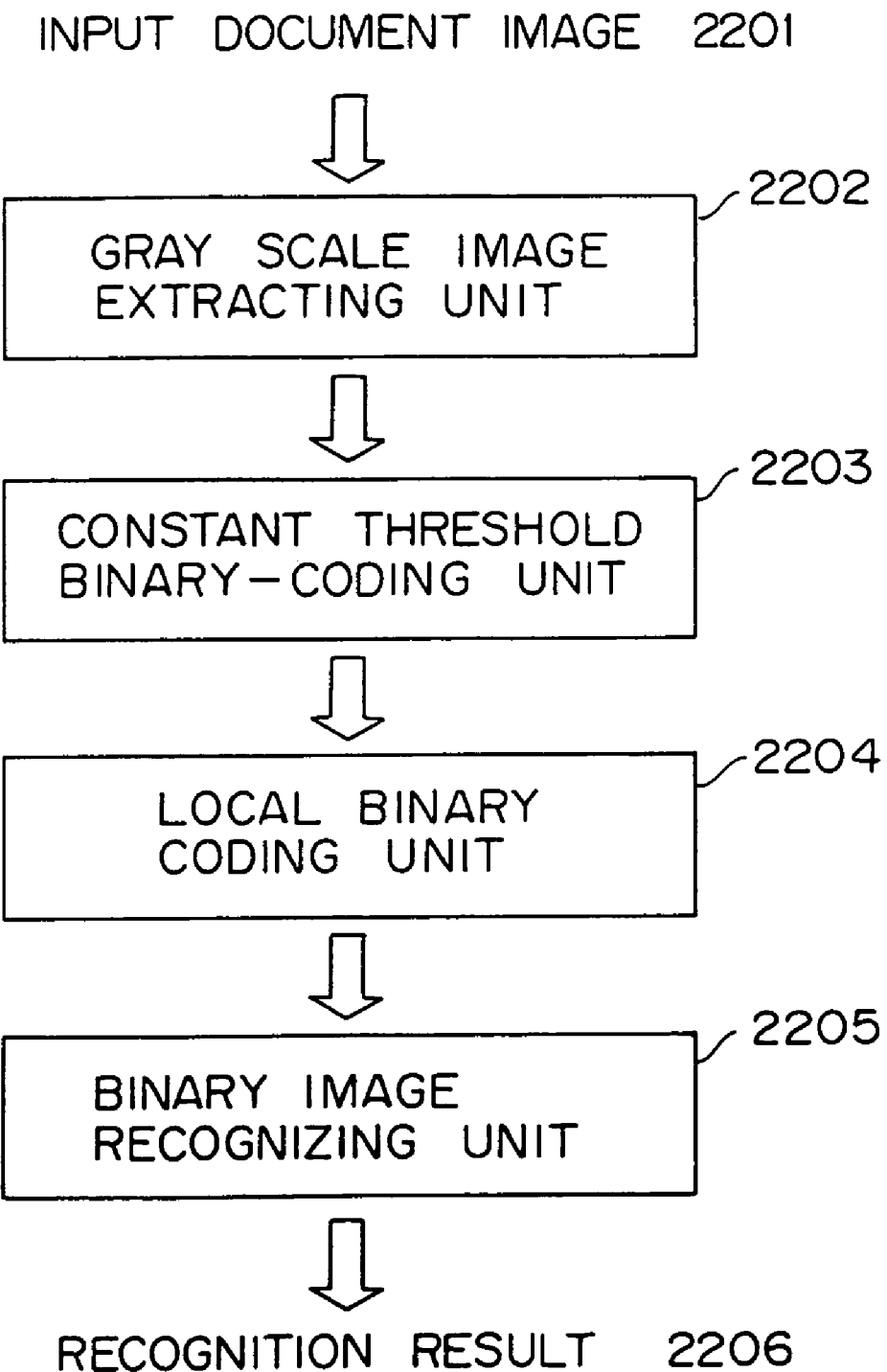
FIG. 1 shows the configuration of a conventional color document image recognizing apparatus.

In the conventional apparatus shown in FIG. 1, the entire gray scale image is collectively binary-coded by the constant threshold binary-coding unit 2203. On the other hand, this preferred embodiment is configured in such a way that a binary-coding process is finely executed for each partial area which is extracted by the partial area extracting unit 104 in the multi-code image binary-coding unit 103. The partial image binary-coding unit 105 for processing a partial image in which input information is limited to a partial area in the gray scale image can also be provided with the functions possessed by the constant threshold binary-coding unit 2203 and the local binary-coding unit 2204 in the conventional apparatus.

For a concrete method for extracting a gray scale image from the input document image 101, that is, a color document in the gray scale image extracting unit 102, a technology for generating a gray scale image by outputting either the lightness element, saturation element or hue element of a color pixel, one of the three primary colors, that is, red, green or blue, or a value which is obtained by assigning the elements or primary colors in a certain calculation expression, as a gray scale value, can be considered. Since the lightness element can store information possessed by many color documents, the lightness is the most typical element that uses a gray scale image which can be extracted.

The partial area extracting unit 104 of the multi-code image binary-coding unit 103 extracts the aggregate of partial areas of a single background color and single plotting color covering the plotting area in the input document image 101, that is, a color document. For the concrete method of this process, a method of extracting one or more partial areas in which both the background color and plotting color in a gray scale image have nearly constant gray scale values can be considered. In this case, a method using a rectangular area of which the shape of the partial area can be easily described can also be considered.

More specifically, a method in which the partial area extracting unit 104 executes an edge extracting process for a gray scale image and extracts one or more partial areas using the obtained edge strength image or edge direction image, can be considered. In the edge extracting process, a Zobel filter or Laplacian filter, which are well known in the field of image processing, can be used.

Furthermore, a method in which the partial area extracting unit 104 obtains an edge binary image representing the outline of a plotting stroke by executing an edge extracting process and extracts one or more partial areas based on the edge binary image, can be considered. A method of obtaining an edge binary image by executing a binary-coding process for the edge strength image of a gray scale image using a general binary-coding method, such as Otsu's binary-coding method when the edge binary image is obtained, can also be considered. Alternatively, a method of obtaining an edge binary image of which the edge outline is somewhat contracted by obtaining a temporary edge binary image by executing a binary-coding process for the edge strength image of a gray scale image using a general binary-coding method, etc., shifting each of the edge pixels of the temporary edge binary image several pixels in the forward or backward direction of an edge direction image and generating an edge image of which the outline formed by the edge pixels is contracted when the edge binary image is obtained, can be considered.

Furthermore, a method in which the partial area extracting unit 104 obtains the coupling element of the edge pixel of an edge binary image and each partial area is obtained based on each coupling element, can also be considered. In this case, the partial area can also be more simply described by designating the circumscribed rectangle of the coupling element for its partial area. Alternatively, a method of designating the overlapping rectangle of a circumscribed rectangle of the coupling element of the edge pixel of an edge binary image for its partial area can be considered.

Figure 3:
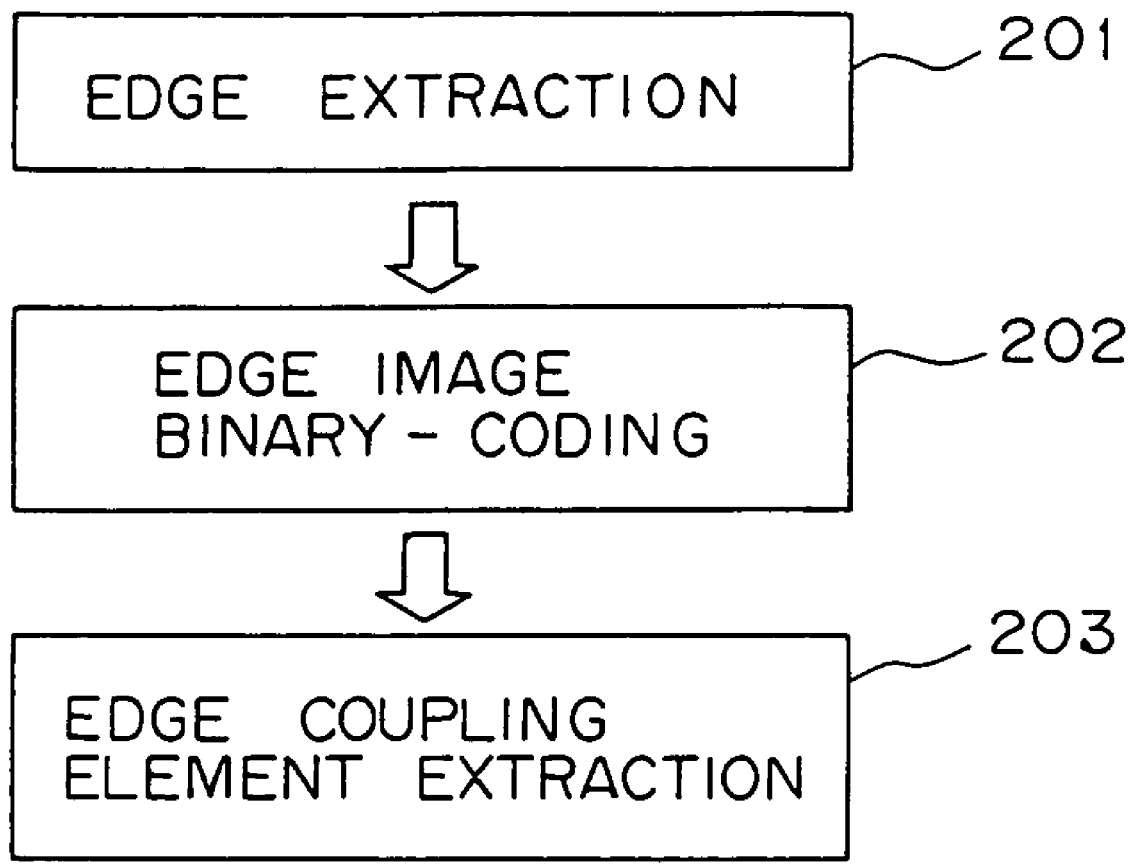
FIG. 3 shows an example of the first configuration of a partial area extracting unit.

FIG. 3 shows an example first configuration of a partial area extracting unit 104.

First, an edge extracting process is executed for a gray scale image using a Zobel filter, etc., and an edge strength image is extracted (201 in FIG. 3).

Then, a binary-coding process is executed for the edge strength image using a constant threshold based on Otsu's binary-coding method, etc., and an edge binary image is extracted (202 in FIG. 3). This edge binary image has the outline of the plotting area of the input document image, that is, a color document as a plotting area.

Then, the aggregate of the coupling elements of the plotting area of the edge binary image is extracted using a technique, such as labeling, etc., and the aggregate of the circumscribed rectangles of the coupling element are outputted as the aggregate of partial areas (203 in FIG. 3).

In the case of a color document in which a plotting area is composed of only characters, portions closely located with the outlines used as a center, of the plotting area of an input document image 101 is considered to have a nearly uniform background and a nearly uniform plotting color. For this reason, the partial area obtained by the partial area extracting unit 104 having this configuration can designate a gray scale partial image suited to be inputted to the partial image binary-coding unit 105 which is based on a prior art.

Figure 4:
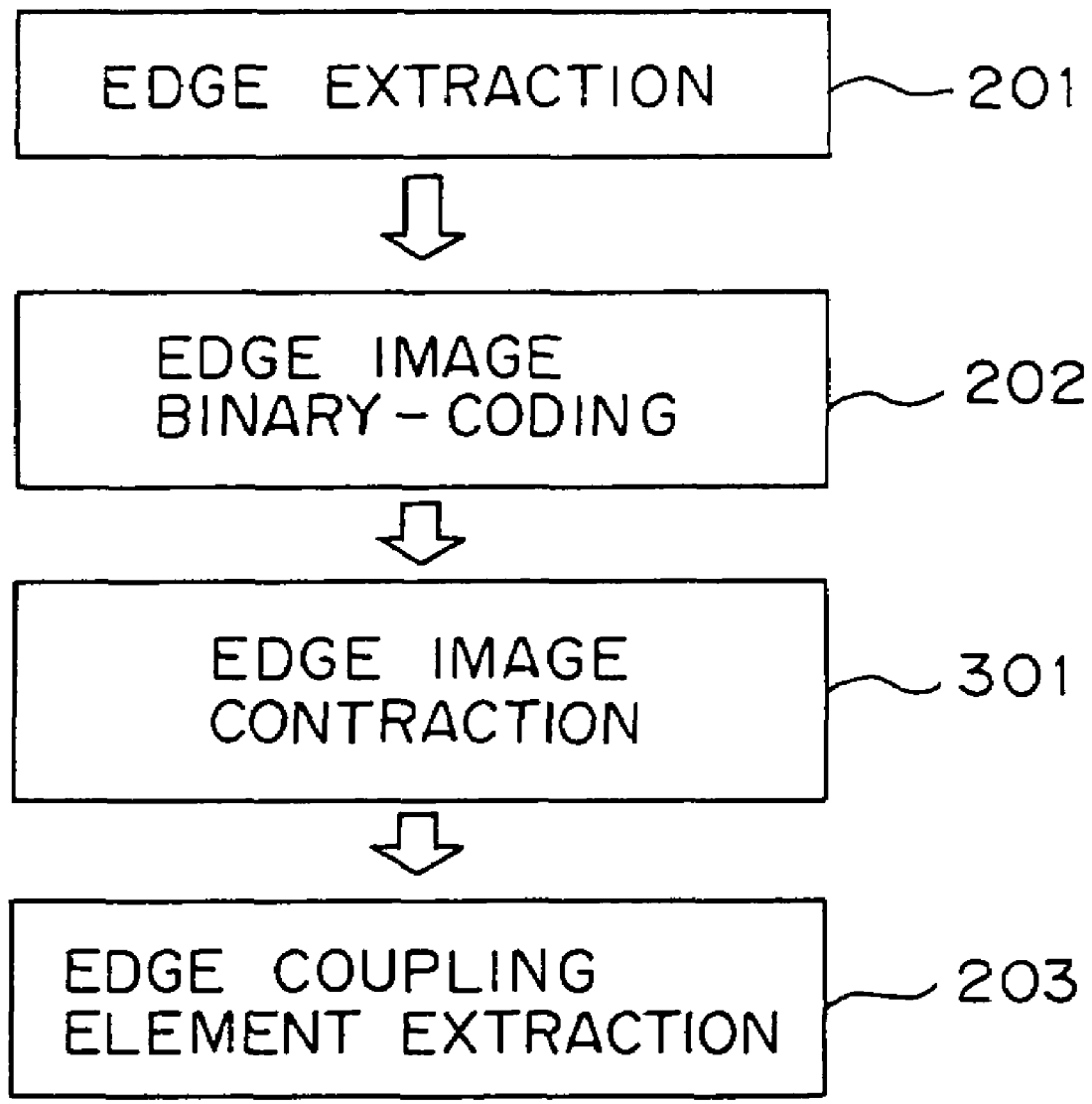
FIG. 4 shows an example of the second configuration of a partial area extracting unit.

FIG. 4 shows an example of the second configuration of a partial area extracting unit 104.

In this example configuration, an edge image contracting process (301 in FIG. 4) is inserted between the edge image binary-coding process (201) and the edge coupling element extracting process (203) of the first example configuration shown in FIG. 3.

In this process, since each edge pixel of an edge binary image is shifted several pixels in the forward or backward direction of the edge direction image and the outline of the image formed by edge elements is contracted, a new edge binary image of which the edge outline is somewhat contracted can be generated.

Then, the aggregate of the coupling elements of the plotting area of the edge binary image is extracted and the aggregate of the circumscribed rectangles of the coupling element are outputted as the aggregate of partial areas (203).

In this way, by adding the contraction process of an edge image, the overlapping of the outlines of a plurality of characters can be prevented and thus the coupling element of an edge can be prevented from becoming large. As a result, in the case of a color document in which a plotting area is composed of only characters, closely located with the outlines used as a center, of the plotting area of an input document image 101 can have a more uniform background and a more uniform plotting color.

Furthermore, a method in which the partial area extract unit 104 judges an extremely long outline from the outlines composing the edge pixel in the edge binary image to be a ruled line, and removes the outline and extracting a partial area based on an edge binary image consisting of only the remaining edge pixels, can be considered. Alternatively, a method of judging outlines which continue with a certain degree of length in a lateral or vertical direction, from the outlines composing of the edge pixel in the edge binary image, to be ruled lines, removing the outlines and extracting a partial area based on the edge binary image composed only of the remaining edge pixels, can be considered.

Figure 5:
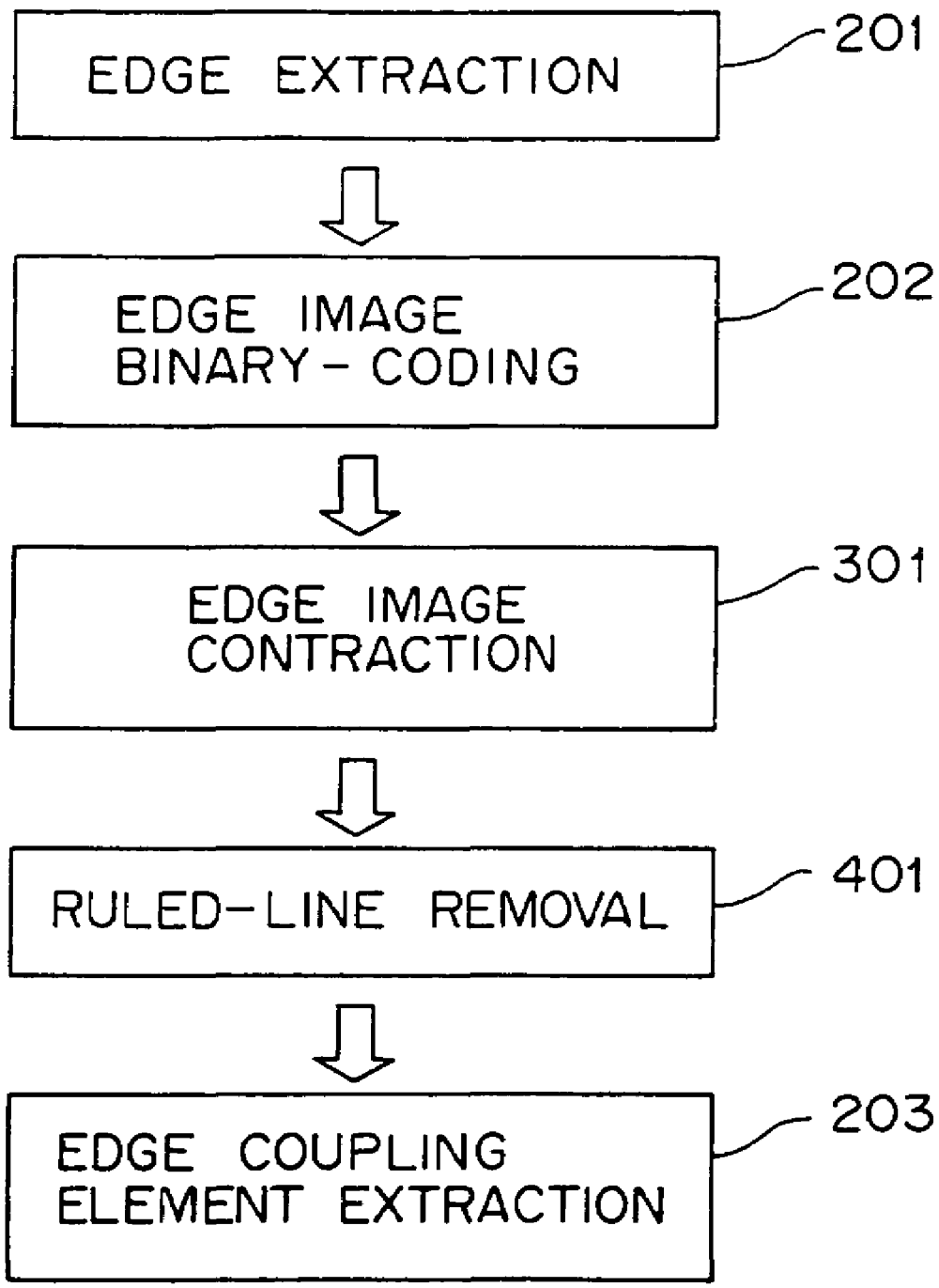
FIG. 5 shows an example of the third configuration of a partial area extracting unit.

FIG. 5 shows an example of the third configuration of a partial area extracting unit 104.

In this example configuration, a ruled-line removing process (401 in FIG. 5) is inserted between the edge image contracting process (301) and the edge coupling element extracting process (203) of the second example configuration shown in FIG. 4.

In this process, edge outlines with a certain degree of length or an unspecified degree of length in a lateral or vertical direction in the edge binary image of which the edge outline is somewhat contracted are judged to be ruled lines and are removed.

Then, the aggregate of the coupling elements of the plotting area of the edge binary image is extracted, and the aggregate of the circumscribed rectangles of the coupling element are outputted as the aggregate of partial areas (203).

By adding such a ruled-line removing process, the edge pixels composing a long outline which is generated in the ruled lines of a table and on the boundary of two background areas, can be removed in a color document composed of not only characters but also ruled lines and a color document in which background areas are set aprat. Therefore, a large partial area, such as an edge coupling element obtained from a long outline can be prevented from being extracted. For this reason, a partial area with two or more background colors or plotting colors may be difficult to be outputted, the aggregate of partial areas covering a text area can be obtained in a color document containing a table composed of not only characters but also ruled lines and a color document in which background areas are indented, and thus a high-accuracy binary image can be obtained for a text area.

Furthermore, a method in which the partial area extracting unit 104 judges an extremely short outline to be a noise removes the extremely short outline from the outlines composing the edge pixel in an edge binary image, and extracts a partial area based on the edge binary image composed of only the remaining edge pixels, can also be considered.

Figure 6:
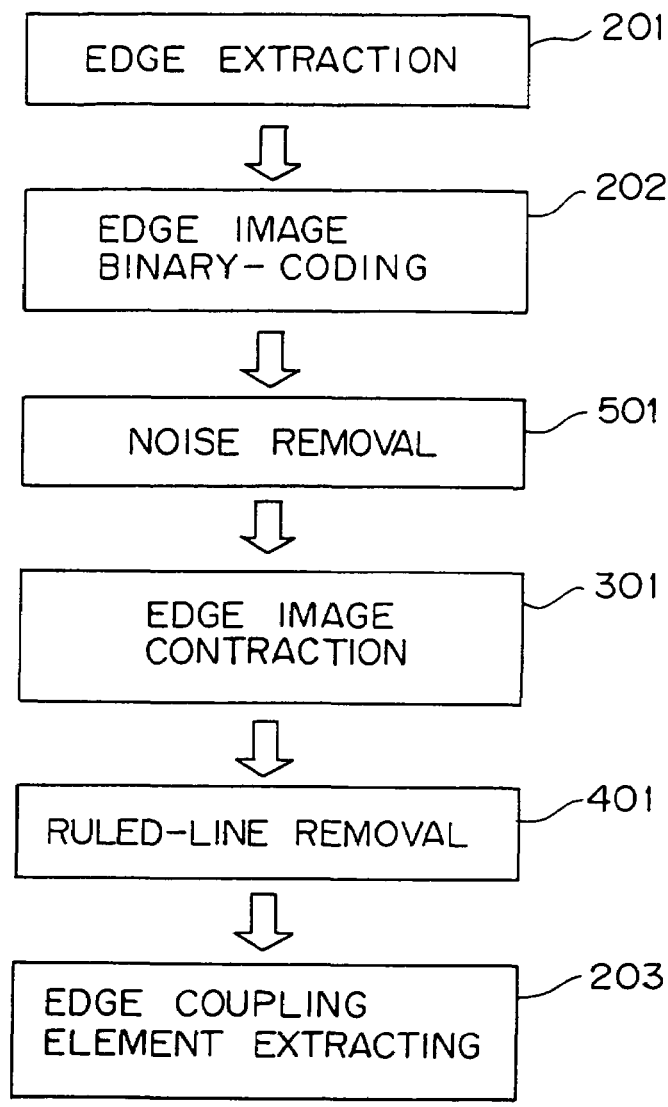
FIG. 6 shows an example of the fourth configuration of a partial area extracting unit.

FIG. 6 shows an example of the fourth configuration of a partial area extracting unit 104.

In this example configuration, a noise removing process (501 in FIG. 6) is inserted between the edge image binary-coding process (201) and the edge image contracting (303) in the third example configuration shown in FIG. 5.

In this process, the noise removing process described above is executed for the edge binary image.

By adding such a noise removing process, noise which is generated by strike-through or disturbance at the time of the input of an input document image 101 and wrongly extracted by edge extraction, can be removed, and thus a partial area with a more uniform background color and a more uniform plotting color can be outputted.

Furthermore, if the partial area extracting unit 104 executes a ruled-line removing process for the outlines composing the edge pixel in an edge binary image, a method of storing and outputting the removed ruled line as another ruled-line binary image can also be considered. Alternatively, a method in which the binary image combining unit 106 computes the logical OR between the generated binary image and the stored ruled-line binary image, and outputs the obtained binary image, can be considered. By using this method, a good binary image can be combined for a color image containing drawings and characters composed of tables and strokes too, and thus high-accuracy document recognition can be obtained.

The partial image binary-coding unit 105 of the multi-code image binary-coding unit 103 generates one or more partial binary images by executing a binary-coding process for a gray scale partial image corresponding to each partial area extracted by the partial area extracting unit 104.

For a concrete method for this process, a variety of techniques which are suited to a document image with a single background color and a single plotting color, like a binary-coding function which is also used in the conventional apparatus, can be considered.

Figure 7:
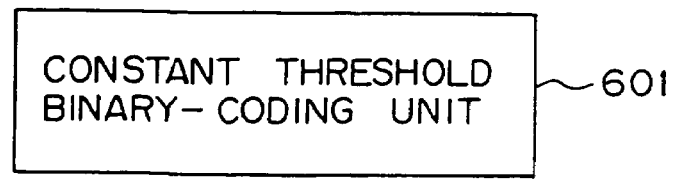
FIG. 7 shows an example of the first configuration of a partial image binary-coding unit.

FIG. 7 shows an example of the first configuration of a partial image binary-coding unit 105.

In this example configuration, since the partial image binary-coding unit 105 executes a binary-coding process using a constant threshold, such as Otsu's binary-coding threshold, etc., (601 in FIG. 7) for the designated partial area of a gray scale image, a partial binary image can be obtained. For the constant threshold, the linear sum of the mean value, standard deviation and distribution of the pixel value of the designated partial area can also be used. An example of this is shown in equation 1. A general process parameter is a constant.

Threshold=Mean value of all pixel values+General process parameter×Standard deviation of all pixel values  [Equation 1]

As shown in the following equation 2, the standard deviation can be obtained using the distribution. As shown in the following equation 3, the distribution can be obtained using the mean value and square mean value.

Standard deviation=(Distribution)$^{1/2}$  [Equation 2]

Distribution=Square mean value−(Mean value)$^2$  [Equation 3]

Figure 8:
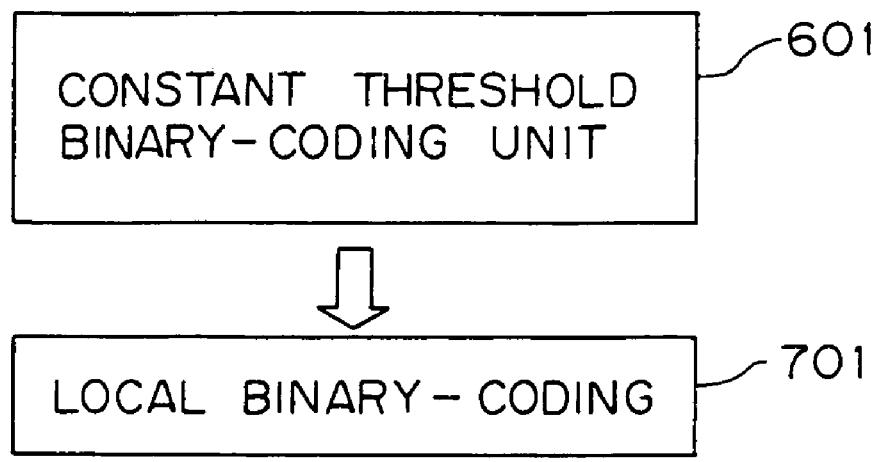
FIG. 8 shows an example of the second configuration of a partial image binary-coding unit.

FIG. 8 shows an example of the second configuration of a partial image binary-coding unit 105.

In this example configuration, after the partial image binary-coding unit 105 roughly extracts a plotting area in the same way as in FIG. 7 (601), the partial image binary-coding unit 105 executes a local binary-coding process to obtain a variable threshold for each pixel in the plotting area (701 in FIG. 8), a partial binary image can be obtained. For the variable threshold used in this local binary-coding process, the linear sum of the mean value, standard deviation and distribution of a pixel value in a local area containing the pixel to be binary-coded for a gray scale partial image corresponding to the partial area can also be used. For example, a threshold can be calculated using the following equation 4 within a local range for each pixel (a square area with a focussed pixel in the center). A local binary-coding parameter is a constant.

Threshold value=Mean value of gray scale pixel values in local area+Local binary-coding parameter×Standard deviation of gray scale pixel value  [Equation 4]

By using the partial image binary-coding unit 105 according to the second example configuration, partial binary-coding more resistant to the change of the background color or character color in the partial area than the first example configuration can be performed, and thus more accurate color document recognition can be realized.

Figure 9:
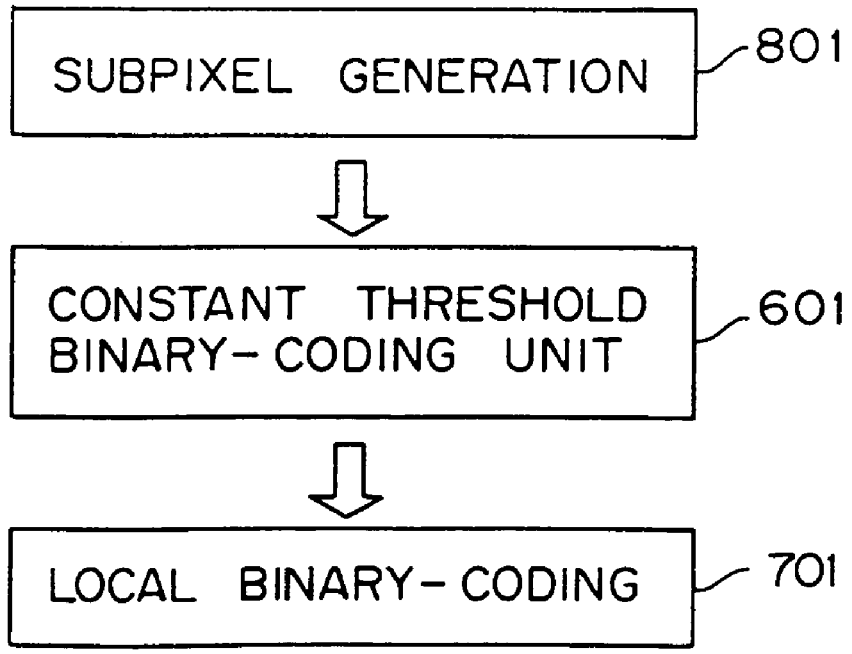
FIG. 9 shows an example of the third configuration of a partial image binary-coding unit.

FIG. 9 shows an example of the third configuration of a partial image binary-coding unit 105.

In this example configuration, the partial image binary-coding unit 105 executes a subpixel generating process which increases the number of pixels by interpolating their pixel values for a gray scale image prior to a binary-coding process using the same constant threshold as in FIG. 8 (601). In this process, for example, the linear interpolating process of pixel values is executed.

According to this third example configuration, since a good binary-coding image can be obtained for low-resolution documents, such as those of 150 dpi and 100 dpi which often exist in a color document image due to the limitation of storage capacity and processing speed, without losing information stored in a gray scale image due to a binary-coding process, far more accurate color document recognition than in the first and second example configurations can be obtained.

Furthermore, a method of changing the size of the local area containing the pixel to be binary-coded of a gray scale partial image corresponding to a partial area for each partial area using the width of a plotting area contained in the partial area or the size of the partial area itself when a variable threshold to be used for the local binary-coding process described above is obtained, can be considered. If this method is used, when a plotting area with a thick character stroke, such as a title character, etc., is extracted using a local binary-coding process, the occurrence of gray-white-flecked noise can be prevented since all local areas are prevented from being included in the plotting area for a specific pixel, and thus far more accurate color document recognition than in the third example configuration can be realized.

Concrete methods in which the binary image combining unit 106 of the multi-code image binary-coding unit 103 shown in FIG. 2 generates a binary image for the entire gray scale image by combining one or more obtained partial binary images, are as follows.

First, a method in which the binary image combining unit 106 sets the pixel value in a binary image to be outputted, corresponding to a pixel which is not contained in any partial area of a gray scale image, to the value of a background color, and obtains the pixel value in a binary image to be outputted, corresponding to a pixel which is contained in one or more partial areas of the gray scale image by some operation, such as a logical OR in which corresponding pixel values in a partial binary image obtained from each partial area are combined, etc., can be considered.

A method in which the binary image combining unit 106 assigns a corresponding pixel value in a partial binary image obtained from a top-priority partial area which is determined by the quantitative priority of a partial area, such as the size of a partial area, etc., as a pixel value in a binary image to be outputted, corresponding to a pixel which is contained in one or more partial areas of a gray scale image, can be considered. This method can reduce the possibility of noise combination compared with the previous method, and thus a higher-quality binary image can be generated.

Example processes of the preferred embodiments of the present invention described above are described below.

Figure 10:
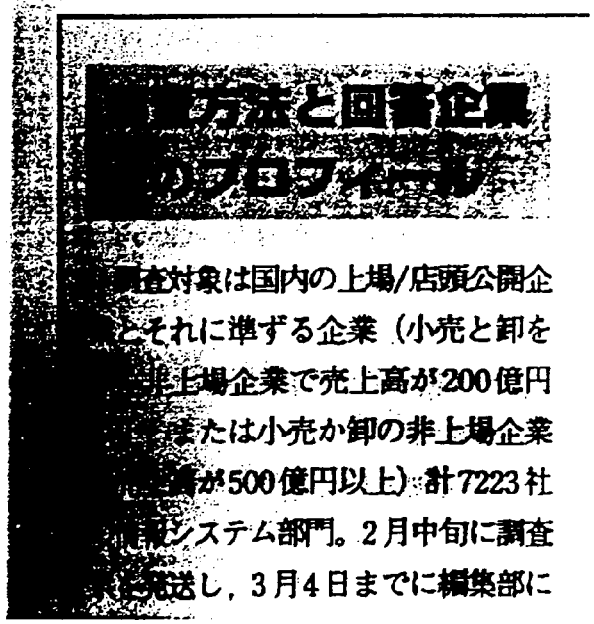
FIG. 10 shows an example color document (No. 1).
Figure 11:
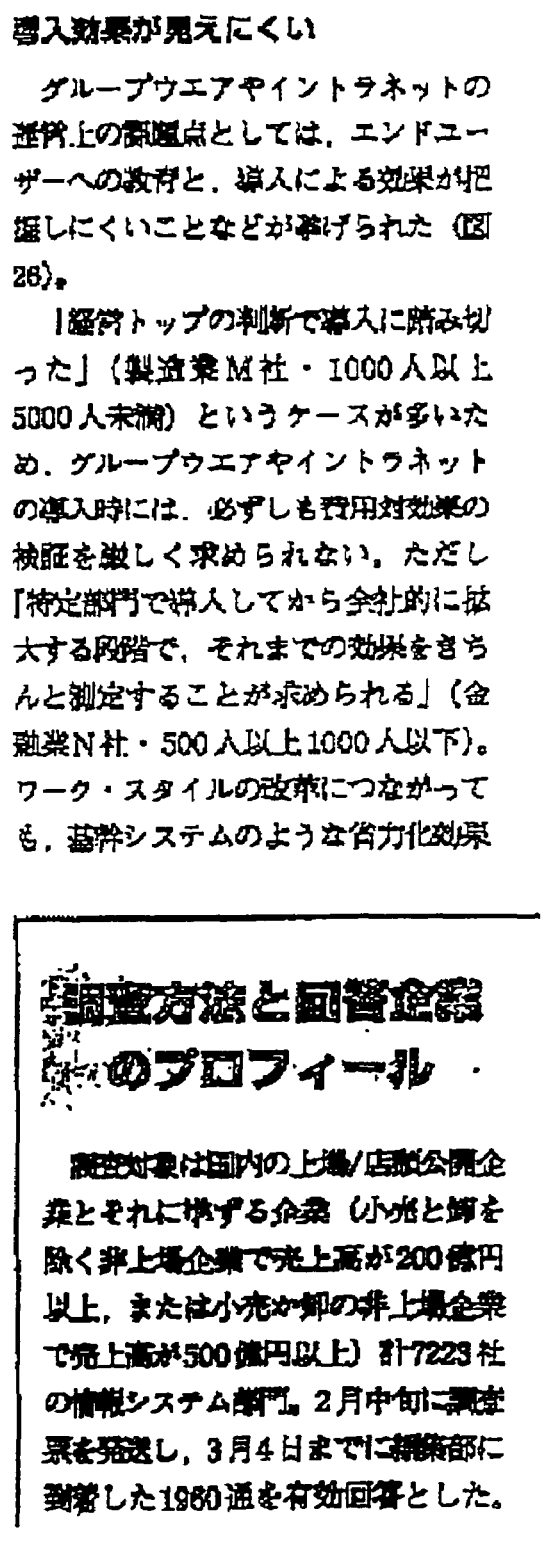
Figure 12:
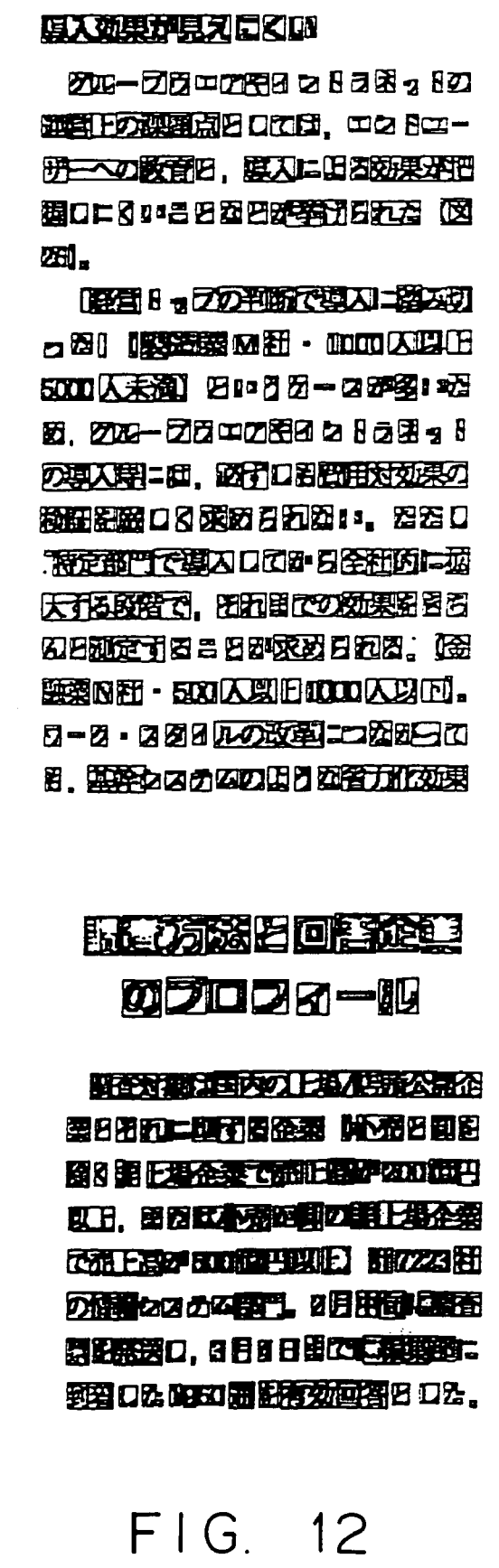

FIG. 10 shows an example color document at a resolution of 150 dpi with a plurality of plotting colors and a plurality of background colors (No. 1). FIG. 11 shows an example binary-coding result of the example document shown in FIG. 10 according to the conventional apparatus having the configuration shown in FIG. 1. FIG. 12 shows an example partial area extraction (No. 1) of the example document shown in FIG. 10 according to the partial area extracting unit 104 in the preferred embodiment having the configuration shown in FIGS. 2 and 6. In FIG. 12, the circumscribed rectangle of the coupling element of an edge in an edge binary image is extracted as a partial area. In FIG. 12, both an edge binary image which can be obtained by executing either a noise removing process (501 in FIG. 6), edge image contracting process (301 in FIG. 6) and ruled-line removing process (401 in FIG. 6) and the aggregate of the circumscribed rectangles representing partial areas overlap.

Figure 13:
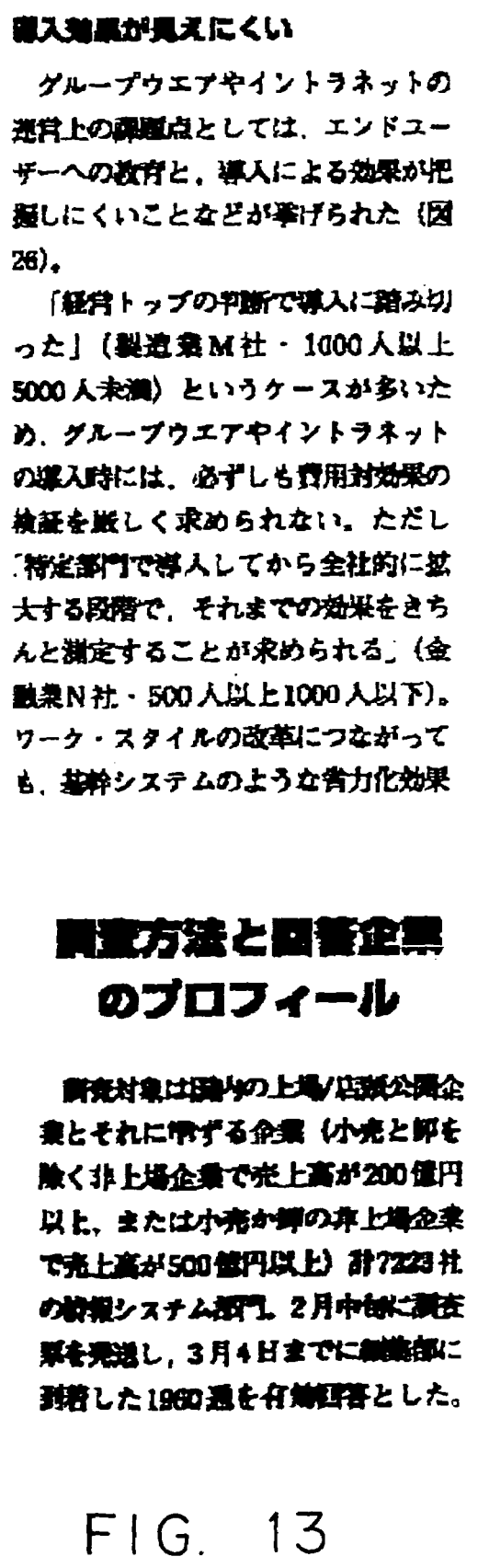

In FIG. 11 a part of the image in a location where the background color is set apart, is incorrectly extracted as a plotting area, while in FIG. 13 there is no such incorrect extraction.

FIG. 13 shows an example binary-coding result of the example document shown in FIG. 10 according to the preferred embodiment of the present invention having the configuration shown in FIGS. 2 and 6. A character area in a color document is excellently extracted. Since ruled lines are removed, only ruled-line information can be outputted as a separate binary image or it can be combined with the main image and outputted, although this is not shown in FIG. 13.

FIG. 14 shows an example color document at a resolution of 150 dpi with gradated background color (No. 2). FIG. 15 shows an example binary-coding result of the example document shown in FIG. 14 according to the conventional apparatus having the configuration shown in FIG. 1. FIG. 16 shows an edge strength image after an edge extracting process (201 in FIG. 6) has been performed on the example document shown in FIG. 14 according to the partial area extracting unit 104 in the preferred embodiment of the present invention having the configuration shown in FIGS. 2 and 6. FIG. 17 shows an edge binary image after an edge image binary-coding process (202 in FIG. 6) has been performed on the edge strength image. FIG. 18 shows an edge binary image after an edge image contracting process (301 in FIG. 6) has been performed on the edge binary image. FIG. 19 shows an image after a noise removing process (501 in FIG. 6) has been performed on the contracted image. The process order of 501 and 301 in FIG. 6 can be inverted. FIG. 20 shows an image after a ruled-line removing process (401 in FIG. 6) in which ruled lines have been removed from the image of which the noise is removed. FIG. 21 shows an example partial area extraction after an edge coupling element extracting process (203 in FIG. 6) has been performed on the image of which the ruled lines are removed (No. 2).

In FIG. 15, a part of a background area is incorrectly extracted as a plotting area in a location where background color is gradated, while in FIG. 22, there is no such incorrect extraction after processes shown in FIGS. 16 through 21.

FIG. 22 shows an example binary-coding result of the example document shown in FIG. 14 according to the preferred embodiment of the present invention (No. 2). A character area in a color document is excellently extracted. Since ruled lines are removed, only ruled-line information can be outputted as a separate binary image or it can be combined with the main image and outputted, although it is not shown in FIG. 22.

Judging from the process results described above it is found that according to the preferred embodiments of the present invention, high-accuracy color document recognition can be realized.

What is claimed is:

1. An apparatus for recognizing a gray scale image, comprising:
    inputting means for inputting a gray scale image; and
    multi-code image binary-coding means for converting the inputted gray scale image to a binary image by determining whether each pixel corresponds to a background area or a plotting area and producing binary values in which each pixel has a value representing either a background area or a plotting area in the gray scale image, said multi-code image binary-coding means comprising:
    partial area extracting means for one or more partial areas in the gray scale image,
    partial image binary-coding means for executing a binary-coding process for each of the partial areas of the gray scale image and extracting a partial binary image, and
    binary image combining means for combining the one or more partial binary images and for constituting the binary image of the entire scale image.

2. The apparatus according to claim 1, further comprising binary image recognizing means for recognizing a binary image outputted by said multi-code image binary-coding means and electronically coding the binary image.

3. An apparatus for recognizing a color document image, comprising:
    gray scale image extracting means for extracting a gray scale image from an inputted color document image; and
    multi-code image binary-coding means for converting the gray scale image to a binary image by determining whether each pixel of the gray scale image corresponds to a background area or a plotting area and producing binary values in which each pixel has a value representing either a background area or a plotting area in the gray scale image.

4. An apparatus for recognizing a color document image, comprising:
- gray scale image extracting means, when an inputted document image is a color document image, for extracting a gray scale image from the color document image; and
- multi-code image binary-coding means, when an inputted document image is a color document image, for converting a gray scale image extracted by the gray scale image extracting means to a binary image by determining whether each pixel of the gray scale image corresponds to a background area or a plotting area and producing binary values in which each pixel has a value representing either a background area or a plotting area in the gray scale image, or when an inputted document image is a gray scale image, for converting the gray scale image to a binary image in which each pixel has a value representing either a background area or a plotting area in the gray scale image.

5. An apparatus for recognizing a gray scale image, comprising:
- inputting means for inputting a gray scale image; and
- multi-code image binary-coding means for converting the inputted gray scale image to a binary image in which each pixel has a value representing either a background area or a plotting area in the gray scale image, wherein
- said multi-code image binary-coding means further comprises:
- partial area extracting means for extracting one or more partial areas in the gray scale image,
- partial image binary-coding means for executing a binary-coding process for each of the partial areas of the gray scale image and extracting a partial binary image; and
- binary image combining means for combining the one or more partial binary images and for constituting the binary image of the entire scale image, and
- where said binary image combining means sets a pixel value in the binary image to be outputted, corresponding to a pixel which is not contained in any of the partial areas in the gray scale image to a value of a background color.

6. An apparatus for recognizing a gray scale image, comprising:
- inputting means for inputting a gray scale image; and
- multi-code image binary-coding means for converting the inputted gray scale image to a binary image in which each pixel has a value representing either a background area or a plotting area in the gray scale image; wherein
- said multi-code image binary-coding means further comprises:
- partial area extracting means for one or more partial areas in the gray scale image;
- partial image binary-coding means for executing a binary-coding process for each of the partial areas of the gray scale image and extracting a partial binary image, and
- binary image combining means for combining the one or more partial binary images and for constituting the binary image of the entire scale image, and
- where said binary image combining means calculates a pixel value in the binary image to be outputted, corresponding to a pixel which is contained in one or more of the partial areas in the gray scale image, by a logical operation in which corresponding pixel values in the partial binary images obtained from each partial area are combined.

7. An apparatus for recognizing a gray scale image, comprising:
- inputting means for inputting a gray scale image; and
- multi-code image binary-coding means for converting the inputted gray scale image to a binary image in which each pixel has a value representing either a background area or a plotting area in the gray scale image, wherein
- said multi-code image binary-coding means further comprises:
- partial area extracting means for one or more partial areas in the gray scale image,
- partial image binary-coding means for executing a binary-coding process for each of the partial areas of the gray scale image and extracting a partial binary image; and
- binary image combining means for combining the one or more partial binary images and for constituting the binary image of the entire scale image, and
- where said binary image combining means assigns a corresponding pixel value in the partial binary image obtained from the partial area with top-priority which is determined based on a quantitative priority according to a predetermined criterion as a pixel value in the binary image to be outputted, corresponding to a pixel which is contained in one or more partial areas of the gray scale image.

8. An apparatus for recognizing a gray scale image, comprising:
- inputting means for inputting a gray scale image; and
- multi-code image binary-coding means for converting the inputted gray scale image to a binary image by determining whether each pixel corresponds to a background area or a plotting area and producing binary values in which each pixel has a value representing either a background area or a plotting area in the gray scale image, wherein
- said multi-code image binary-coding means further comprises:
- partial area extracting means for one or more partial areas in the gray scale image,
- partial image binary-coding means for executing a binary-coding process for each of the partial areas of the gray scale image and extracting a partial binary image; and
- binary image combining means for combining the one or more partial binary images and for constituting the binary image of the entire scale image, and
- where said partial area extracting means extracts one or more partial areas where both background color and plotting color of the gray scale image each have a specific gray scale value.

9. An apparatus for recognizing a gray scale image, comprising:
- inputting means for inputting a gray scale image; and
- multi-code image binary-coding means for converting the inputted gray scale image to a binary image in which each pixel has a value representing either a background area or a plotting area in the gray scale image, wherein
- said multi-code image binary-coding means further comprises:
- partial area extracting means for one or more partial areas in the gray scale image,
- partial image binary-coding means for executing a binary-coding process for each of the partial areas of the gray scale image and extracting a partial binary image; and
- binary image combining means for combining the one or more partial binary images and for constituting the binary image of the entire scale image, and where said partial area extracting means outputs one or more rectangular areas as the partial areas.

10. An apparatus for recognizing a gray scale image, comprising:
inputting means for inputting a gray scale image; and
multi-code image binary-coding means for converting the inputted gray scale image to a binary image in which each pixel has a value representing either a background area or a plotting area in the gray scale image, wherein said multi-code image binary-coding means further comprises:
partial area extracting means for one or more partial areas in the gray scale image,
partial image binary-coding means for executing a binary-coding process for each of the partial areas of the gray scale image and extracting a partial binary image; and
binary image combining means for combining the one or more partial binary images and for constituting the binary image of the entire scale image, and
where said partial area extracting means extracts one or more partial areas using an edge strength image or edge direction image obtained by executing an edge extracting process for the gray scale image.

11. The apparatus according to claim 10, wherein the edge extracting process is executed using either a Zobel filter or a Laplacian filter.

12. The apparatus according to claim 10, wherein said partial area extracting means calculates an edge binary image representing an outline of a plotting stroke by the edge extracting process and extracting the one or more partial areas based on this edge binary image.

13. The apparatus according to claim 12, wherein said partial area extracting means calculates the edge binary image by executing a binary-coding process for the edge strength image corresponding to the gray scale image.

14. The apparatus according to claim 12, wherein said partial area extracting means calculates said edge binary image of which the edge outline is somewhat contracted by executing a binary-coding process for the edge strength image corresponding to a gray scale image to calculate a temporary edge binary image, shifting each edge pixel of the temporary edge binary image in the forward or backward direction of the edge direction image to contract the outline formed by the edge pixels.

15. The apparatus according to claim 12, wherein said partial area extracting means calculates coupling elements of the edge element of the edge binary image and calculates each of the partial areas based on each of the coupling elements.

16. The apparatus according to claim 15, wherein said partial area extracting means calculates a circumscribed rectangle of each of the coupling elements as each of the partial areas.

17. The apparatus according to claim 15, wherein said partial area extracting means calculates an overlapping rectangle of a circumscribed rectangle of each of the coupling elements as each partial area.

18. The apparatus according to claim 12, wherein said partial area extracting means judges an extremely long outline from outlines composed of edge pixels in the edge binary image to be a ruled line, removes the extremely long outline and extracts the partial area based on an edge binary image which is composed of only remaining edge pixels.

19. The apparatus according to claim 18, wherein said partial area extracting means stores and outputs an outline portion judged and removed as the ruled line, as a ruled-line binary image.

20. The apparatus according to claim 19, wherein said binary image combining means performs a logical operation between a binary image generated by said binary image combining means and the ruled-line binary image stored and outputted, and outputs an obtained binary image.

21. The apparatus according to claim 12, wherein said partial area extracting means judges outlines of a predetermined length sequentially arranged in a lateral or vertical direction from outlines composed of edge pixels in the edge binary image to be ruled lines, removes the outlines and extracts the partial area based on an edge binary image which is composed of only remaining edge pixels.

22. The apparatus according to claim 21, wherein said partial area extracting means stores and outputs an outline portion judged and removed as the ruled line, as a ruled-line binary image.

23. The apparatus according to claim 22, wherein said binary image combining means performs a logical operation between a binary image generated by said binary image combining means and the ruled-line binary image stored and outputted, and outputs an obtained binary image.

24. The apparatus according to claim 12, wherein said partial area extracting means judges an extremely short outline from outlines composed of edge pixels in the edge binary image as noise, removes the outlines and extracts the partial area based on an edge binary image which is composed of only remaining edge pixels.

25. An apparatus for recognizing a gray scale image, comprising:
inputting means for inputting a gray scale image; and
multi-code image binary-coding means for converting the inputted gray scale image to a binary image in which each pixel has a value representing either a background area or a plotting area in the gray scale image, wherein said multi-code image binary-coding means further comprises:
partial area extracting means for one or more partial areas in the gray scale image,
partial image binary-coding means for executing a binary-coding process for each of the partial areas of the gray scale image and extracting a partial binary image; and
binary image combining means for combining the one or more partial binary images and for constituting the binary image of the entire scale image, and
where said partial image binary-coding means extracts the partial binary image by executing a binary-coding process for a designated partial area of the gray scale image, based on a single threshold.

26. The apparatus according to claim 25, wherein the single threshold is determined by calculating a linear sum of mean values, standard deviation and distribution of pixel values in the designated partial area.

27. An apparatus for recognizing a gray scale image, comprising:
inputting means for inputting a gray scale image; and
multi-code image binary-coding means for converting the inputted gray scale image to a binary image in which each pixel has a value representing either a background area or a plotting area in the gray scale image, wherein said multi-code image binary-coding means further comprises:
partial area extracting means for one or more partial areas in the gray scale image,
partial image binary-coding means for executing a binary-coding process for each of the partial areas of the gray scale image and extracting a partial binary image; and binary image combining means for combining the one or more partial binary images and for constituting the binary image of the entire scale image, and where said partial image binary-coding means roughly extracts a plotting area by executing a binary-coding process for a designated partial area of the gray scale image, based on a single threshold, and extracts the partial binary image by executing a local binary-coding process in which a variable threshold is obtained for each pixel in the plotting area.

28. The apparatus according to claim 27, wherein the single threshold is determined by calculating a linear sum of mean values, standard deviation and distribution of pixel values in the designated local area.

29. The apparatus according to claim 27, wherein the variable threshold is determined by calculating a linear sum of mean values, standard deviation and distribution of pixel values in a local area containing a pixel to be binary-coded in the gray scale image corresponding to the designated partial area.

30. The apparatus according to claim 29, wherein said partial image binary-coding means changes a size of the local area according to a width of a plotting area contained in the partial area when calculating the variable threshold.

31. The apparatus according to claim 29, wherein said partial image binary-coding means changes a size of the local area according to a size of the partial area when calculating the variable threshold.

32. An apparatus for recognizing a gray scale image, comprising:

inputting means for inputting a gray scale image; and multi-code image binary-coding means for converting the inputted gray scale image to a binary image in which each pixel has a value representing either a background area or a plotting area in the gray scale image, wherein said multi-code image binary-coding means further comprises:

partial area extracting means for one or more partial areas in the gray scale image, partial image binary-coding means for executing a binary-coding process for each of the partial areas of the gray scale image and extracting a partial binary image; and binary image combining means for combining the one or more partial binary images and for constituting the binary image of the entire scale image, and where said partial image binary-coding means calculates a gray scale partial image corresponding to a designated partial area by interpolating a pixel value of the gray scale image and executing a subpixel generating process which increases a number of pixels of an image, and extracts the partial binary image by executing the binary-coding process for the gray scale partial image.

33. The apparatus according to claim 32, wherein the subpixel generating process includes a linear interpolation process for the pixel value.

34. The apparatus according to claim 32, wherein the variable threshold is determined by calculating a linear sum of mean values, standard deviation and distribution of pixel values in a local area containing a pixel to be binary-coded in the gray scale image corresponding to the designated partial area.

35. The apparatus according to claim 34, wherein said partial image binary-coding means changes a size of the local area according to a width of a plotting area contained in the partial area when calculating the variable threshold.

36. The apparatus according to claim 34, wherein said partial image binary-coding means changes a size of the local area according to a size of the partial area when calculating the variable threshold.

37. An apparatus for recognizing a gray scale image, comprising: an input unit inputting a gray scale image; and a multi-code image binary-coding-unit converting the inputted gray scale image to a binary image by determining whether each pixel corresponds to a background area or a plotting area and producing binary values in which each pixel has a value representing either a background area or a plotting area in the gray scale image, said multi-code image binary-coding means comprising:

partial area extracting means for one or more partial areas in the gray scale image, partial image binary-coding means for executing a binary-coding process for each of the partial areas of the gray scale image and extracting a partial binary image, and binary image combining means for combining the one or more partial binary images and for constituting the binary image of the entire scale image.

38. An apparatus for recognizing a color document image, comprising:

a gray scale image extracting unit extracting a gray scale image from an inputted color document image; and a multi-code image binary-coding unit converting the gray scale image to a binary image by determining whether each pixel of the gray scale image corresponds to a background area or a plotting area and producing binary values in which each pixel has a value representing either a background area or a plotting area in the gray scale image.

39. An apparatus for recognizing a color document image, comprising;

a gray scale image extracting unit, when an inputted document image is a color document image, extracting a gray scale image from the color document image; and a multi-code image binary-coding unit when an inputted document image is a color document image, converting a gray scale image extracted by the gray scale image extracting unit to a binary image by determining whether each pixel of the gray scale image corresponds to a background area or a plotting area and producing binary values in which each pixel has a value representing either a background area or a plotting area in the gray scale image, or when an inputted document image is a gray scale image, converting the gray scale image to a binary image in which each pixel has a value representing either a background area or a plotting area in the gray scale image.

* * * * *

UNITED STATES PATENT AND TRADEMARK OFFICE
CERTIFICATE OF CORRECTION

PATENT NO. : 7,024,043 B1
APPLICATION NO. : 09/372037
DATED : April 4, 2006
INVENTOR(S) : Katsuhito Fujimoto et al.

Page 1 of 1

It is certified that error appears in the above-identified patent and that said Letters Patent is hereby corrected as shown below:

First Page Column 2 (Abstract), Line 7, after "multi-code" insert --image--.

Column 16, Line 12, "binary-coding -unit" to --binary-coding unit--.

Column 16, line 39, after "comprising" change ";" to --:--.

Signed and Sealed this

Thirtieth Day of January, 2007

JON W. DUDAS
*Director of the United States Patent and Trademark Office*